United States Patent [19]

Kurandt et al.

[11] Patent Number: 4,508,574

[45] Date of Patent: Apr. 2, 1985

[54] PROCESS FOR IMPROVING THE FLUIDITY AND CONVEYABILITY OF MOIST CALCIUM SULFATE PRECIPITATES

[75] Inventors: Hans-Friedrich Kurandt, Luenburg; Karl-Heinz Kampner, Embsen, both of Fed. Rep. of Germany

[73] Assignee: Chemische Werke Huls Ag, Marl, Fed. Rep. of Germany

[21] Appl. No.: 545,241

[22] Filed: Oct. 25, 1983

[30] Foreign Application Priority Data

Oct. 27, 1982 [DE] Fed. Rep. of Germany ....... 3239768

[51] Int. Cl.$^3$ ............................................. C04B 11/10
[52] U.S. Cl. ................................... 106/109; 106/110; 106/118; 106/121
[58] Field of Search ................ 106/109, 110, 118, 121

[56] References Cited

U.S. PATENT DOCUMENTS

| | | | |
|---|---|---|---|
| 2,937,926 | 5/1960 | Hanusch | 106/109 |
| 3,159,497 | 12/1964 | Yamaguchi | 106/110 |
| 3,414,462 | 12/1968 | Cafferata | 106/110 |
| 3,827,897 | 8/1974 | Dumont | 106/110 |
| 3,945,841 | 3/1976 | Dumont | 106/110 |

*Primary Examiner*—James Poer
*Attorney, Agent, or Firm*—Oblon, Fisher, Spivak, McClelland & Maier

[57] ABSTRACT

A process for improving the fluidity and conveyability properties of moist calcium sulfate precipitates, having a free water content of more than about 5% by weight, which entails mixing quicklime (CaO), burnt dolomite (CaO+MgO) or a mixture thereof, in finely ground form to said moist calcium sulfate precipitate in an amount of about 10% by weight or greater, based upon the calcium sulfate content, to form a homogeneous mixture of the same.

The homogenized mixtures so prepared have good pourability and can be conveniently stored or conveyed. They can be used as setting retarders in cement or, they can be used in the production of gypsum wall board and plaster.

7 Claims, No Drawings

4,508,574

PROCESS FOR IMPROVING THE FLUIDITY AND CONVEYABILITY OF MOIST CALCIUM SULFATE PRECIPITATES

BACKGROUND OF THE INVENTION

1. Field of the Invention

This invention relates to a process for improving the fluidity and conveyability of moist Calcium Sulfate precipitates.

2. Description of the Prior Art

Calcium sulfate (gypsum) is a waste product generated in many chemical processes. In phosphoric acid processes, for example, many million tons of gypsum are produced each year. However, because economic reprocessing is possible only in a limited way, most of the gypsum produced is hauled to or must be dumped as environmentally harmful waste into rivers or channels or directly into the ocean.

To an increasing degree, gypsum is generated during the desulfurization of flue gas. Here, the $SO_2$ in the flue gases of power plants is first bound with lime milk to produce $CaSO_3$, which is then transformed to gypsum through oxidation.

Although it is possible to process chemically produced gypsum with currently known technology, it is very expensive for several reasons:

1. The material is moister than natural gypsum. In addition to the water of crystallization in the calcium sulfate, the free water content is normally between 5 and 30% by weight. This residual moisture remains in the product because simple filtration or other means of separating the precipitate fail to remove the adhering water without leaving a residue.

2. The flow characteristics of the material are unfavorable. Under the circumstances, it is thixotropic and, therefore, impossible to convey. Discharging the material from silos or other conical bunkers, for example, is hardly possible because masses of this kind behave like "heavy," moist clay whose form can be changed only by means of considerable mechanical effort.

3. As the material is contaminated it can often be used only after special cleaning operations (for example, washing).

Up to now, further processing has been difficult mainly because of the conveying problems mentioned above. Hence, preprocessing steps such as pelletizing or briquetting of the moist gypsum have been developed to facilitate transportation. But such procedures are expensive.

Among the methods of processing phosphoric acid gypsums, to be mentioned are those which neutralize the remaining acid ($H_2SO_4$, $H_3PO_4$ or $HNO_3$, etc) with appropriate amounts of $Ca(OH)_2$, CaO or $CaCO_3$ or with appropriate magnesium compounds. Because the volume fractions of such residual acids are very small, relatively small charges are sufficient. Depending on the amount of gypsum involved, the charges are usually 5% (cf. for example, DE-PS 1 157 128, column 3, lines 49–52 and column 4, lines 16–21 or CS 154 355, according to CA 82, 34518h, (1975).

The disadvantages of the poor flow characteristics of moist di- and semi-hydrate gypsums are hardly reduced by such measures.

It is known from U.S. Pat. Nos. 1,967,959, 2,021,412, 2,063,488 and 2,127,952, that semi-hydrate and anhydrate can be obtained by adding quicklime in amounts of ½ to 4 mole of CaO per mole of $CaSO_4.2H_2O$ (cf. U.S. Pat. No. 2,063,488, page 1, left column, line 41 and U.S. Pat. No. 2,127,952, page 2 left column, line 53) to dihydrate-base natural gypsums. To initiate the process, optionally added is water as (steam), liquid or moist salt admixture. The reaction heat released during hydration of the quicklime serves to remove the water of crystallization from the dihydrate and, in addition, ensures that part of the water evaporates from the moist mixture.

Natural gypsums of this kind usually contain only very small amounts of free moisture, whereas the chemical gypsum, to be processed in accordance with the invention, exhibits moistures that frequently equal the content of the water of crystallization and sometimes even exceed it (cf. page 1, line 21/22).

Through low pressure filtration or centrifuging it is possible to reduce the free water content in chemical gypsum to 20% and—given enough time or high enough centrifuging—to reduce that content even further (cf. example 1, page 8). But no improvement in the fluidity and conveyability can be achieved by this, rather, only a certain degree of energy savings.

Hence, as currently known processes of improving the fluidity and conveyability of chemical gypsums are either inadequate or too expensive, and thus unsatisfactory, a need continues to exist for a simple process which would improve the properties of these bulk products in such a way that difficulties are significantly reduced or eliminated during processing.

SUMMARY OF THE INVENTION

Accordingly, it is an object of the present invention to provide a process for improving the fluidity and conveyability of moist calcium sulfate precipitates in a simple manner which eliminates the need for dump sites for storage of the moist waste product calcium sulfate.

It is also an object of this invention to provide a process for the production of material which can be used as valuable building materials.

Moreover, it is an object of the present invention to provide a process for improving the fluidity and conveyability of moist calcium sulfate precipitate in a simple manner which avoids the contamination of rivers or channels by the dumping of the moist calcium sulfate precipitates into the same.

According to the present invention, the foregoing and other objects are attained by providing a process for improving the fluidity and conveyability properties of moist calcium sulfate precipitates, having a free water content of more than about 5% by weight, which comprises mixing quicklime (CaO), burnt dolomite (CaO+MgO) or a mixture thereof, in finely ground form with said moist calcium sulfate precipitate in an amount of about 10% by weight or greater based upon the calcium sulfate content, to form a homogeneous mixture of the same.

DETAILED DESCRIPTION OF THE PREFERRED EMBODIMENT

According to the present invention, the disadvantages of the poor fluidity and conveyability of the moist calcium sulfate precipitate can suprisingly be eliminated, optionally after appropriate preliminary dewatering to below at least 25%, by mixing quicklime (CaO) and/or burnt dolomite (CaO+MgO) in the amount of at least, 10% preferably 15–60% by weight, with the material to form a homogeneous mixture. For this purpose these addition materials are introduced in finely ground form. Coarse particles greater than 0.5 mm are optionally separated and reground before charging. A portion of the limestone and/or dolomite that is to be burnt may be replaced with magnesite or appropriate amounts of burnt magnesite can be added to the aforementioned calcined raw materials.

The resulting mixtures of the alkaline earth oxides and calcium sulfate precipitates have the following properties:

1. They are completely fluid, so that they can be stored and/or conveyed without difficulties. Removal from silos presents no problem.

2. The impurities in the moist gypsum are bound by the alkaline earth oxides, especially the CaO, for example, water soluble $P_2O_5$ or $F-$, as are the corresponding insoluble calcium salts. The magnesium oxides, by double salt formation, should also contribute to the elimination of the undesirable impurities.

3. The water of crystallization content of the gypsum portions of the mixture is not changed (or is changed only to a limited degree) through mixing. At the same time, however, the free moisture content is considerably reduced, due partly to the chemical bond with $Ca(OH)_2$ and due partly to the heat, and the attendant evaporation, that is released as the alkaline earth oxides are slacked.

4. If these mixtures of semi-hydrate or anhydrate are used at the start, then a subsequent burning is no longer necessary; at most the addition of certain setting catalysts such as stucco or potassium sulfate is required. However, it is no longer necessary to expend additional thermal energy.

5. Although with dihydrate as the starting product, a burning of the mixture is required (dihydrate→semi-hydrate), in this case, too, the energy savings are considerable because of the reduced free moisture content. Because of the amount of $Ca(OH)_2$ already present in the mixture after the CaO treatment, the $Ca(OH)_2$ charge, required in conventionally burnt dihydrate gypsums, is no longer necessary.

Thus the process, according to the invention, which improves the fluidity and conveyability of the waste products in a simple way and also eliminates dump sites and avoids contamination of the waste water entering rivers, channels or oceans. At the same time, the waste products created can be used in a financially advantageous manner as valuable building materials for the cement or construction industry.

The charging materials according to the invention can be mixed so that, for example, the moist and hard to handle material is first roughly premixed with the required amount of CaO in a paddle mixer and then, after a brief reaction period, mixed in a fine mixer. But this mixing can be performed in a single operation.

After treatment the material can be transported either directly to the user or placed in bunkers of any given design for intermediate storage. Thus, problems of conveying or transporting are eliminated. Also, the material is completely free-flowing.

Chemical gypsums with free water contents below 25% can be subjected to CaO charging, according to the invention, generally without additional pretreatment. However, if desired such chemical gypsums can be first dewatered by suction filtration, or appropriate centrifigation. For example, chemical gypsums having a free water content of 12 to 15% can first be dewatered if so desired. Gypsums with higher water contents should first be dewatered by suction filtration or appropriate centrifugation, to minimize the otherwise greater amounts of the relatively expensive CaO that would be required.

For this reason, dewatering is also optionally suitable for sulfates having free water contents of 12 to 25%, relative to $CaSO_4.2H_2O$ or $CaSO_4.\frac{1}{2}H_2O$ or $CaSO_4$.

In general, either $CaSO_4.2H_2O$ or $CaSO_4.\frac{1}{2}H_2O$ will be separated from the aqueous solution.

$CaSO_4$ is usually created only under extreme filtration conditions (temperatures $>100°$ C. and high acid contents). Hence, it will be produced mainly only in smaller amounts (besides the semi-hydrate). Mixtures of this kind are generally to be treated and used like the semi-hydrate. Under the circumstances, it is recommended that the amounts of setting catalysts be increased or other activators be added.

Essentially 100% of the anhydrate is produced as so-called cinder from hydrofluoric acid production, i.e., during fluorspar reaction with concentrated sulfuric acid. The resulting calcium sulfate is formed not as precipitation from the aqueous solution but by direct reaction in the presence of only smaller amounts of water, so that the free water content in it is usually far below 3%. Such products cannot be described as moist calcium sulfate precipitates. They are, therefore, closer to the natural gypsums which are also low in water and, like then, they lie outside the range of the present invention.

Preliminary tests have shown that, in terms of economical usage of alkaline earth oxides and for obtaining optimal pourability, it is most advantageous to add 0.5 to 0.9 Mol alkaline earth oxides per mole of free water to moist calcium sulfate precipitate, which is optionally previously dewatered.

The present invention will be further illustrated by certain examples and references which are provided for purposes of illustration only and are not intended to limit the present invention. All references to free water content are in terms of % by weight.

EXAMPLE 1

(comparative example, not according to the invention)

$CaSO_4.2H_2O$ derived from the production of phosphoric acid, and having a free water content of 30%, is dewatered through centrifugation to a free water content of 9%. Both before and after dewateration the calcium sulfate product had no fluidity and was non-pourable.

EXAMPLE 2

The dihydrate gypsum of Example 1, having a free water content of 30%, was dewatered in a suction filter to a free water content of 19%. The unpourable calcium sulfate product was mixed with 30% quicklime (CaO) and after this became completely pourable.

EXAMPLE 3

$CaSO_4.2H_2O$ from flue gas desulfurization, having a free water content of 7% was mixed with 15% quicklime (CaO). The resulting product exhibited good fluidity.

EXAMPLE 4

Impure calcium sulfate semi-hydrate ($CaSO_4.\frac{1}{2}H_2O$) from the product of phosphoric acid, having a free water content of 15%, was mixed with 40% CaO. The resulting product was completely pourable. Optionally after pregrinding, the product can also be conveyed pneumatically.

It is particularly noteworthy that the calcium sulfate product mixtures made in accordance with Examples 2-4 are, without additional treatment, suitable as setting retarders for cement. Also, as previously noted, there are particular advantages of the present product mixtures with respect to dihydrate gypsums. Namely, due to the amount of $Ca(OH)_2$ already present in the mixture after the CaO treatment, the $Ca(OH)_2$ charge, required in conventionally burnt dihydrate gypsums, is no longer necessary.

Additionally, calcium sulfate product mixtures made in accordance with Example 4 can be used both as a plaster or in the production of wallboard without additional burning or cleaning operations. Also, as previously noted, there are particular advantages of the present product mixtures with respectt to semi-hydrate or anhydrate gypsums. Namely, if these gypsums are used at the start, then subsequent burning is no longer necessary. At most, the addition of certain setting catalysts such as stucco or potassium sulfate is required.

Having now fully described this invention, it will be apparent to one of ordinary skill in the art that many changes and modifications can be made thereto without departing from the spirit or scope of the invention as set forth herein.

What is claimed is claimed as new and desired to be secured by Letters Patent of the United States is:

1. A process for preparing a fluid and conveyable moist calcium sulfate precipitate from calcium sulfate precipitates, having a free water content of more than about 5% by weight, which comprises adding quicklime (CaO) burned dolomite (CaO+MgO) or a mixture thereof, in finely ground form to said water-containing calcium sulfate precipitate in the amount of about 15-60 percent by weight, based upon the calcium sulfate content, to form a homogeneous mixture of the same; and wherein about 0.5 to 0.9 moles of finely ground quicklime, burned dolomite or a mixture thereof are added per mole of free water in said moist calcium sulfate precipitate.

2. The process as in claim 1, wherein the calcium sulfate precipitates are selected from the group consisting of dihydrate gypsum ($CaSO_4.2H_2O$), semihydrate gypsum ($CaSO_4.\frac{1}{2}H_2O$), anhydrate gypsum ($CaSO_4$), or a mixture thereof.

3. The process as in claim 1, which further comprises dewatering the moist calcium sulfate precipitates having a free water content of about 12 to 15% by weight, prior to mixing with said quicklime, burnt dolomite or mixture thereof.

4. The process as in claim 1, which further comprises dewatering the moist calcium sulfate precipitates having a free water content of about 25% by weight or more, prior to mixing with said quicklime, burnt dolomite or mixture thereof.

5. The process as in claim 1, wherein said finely ground quicklime, burnt dolomite or mixture thereof has a particle size of about 0.5 mm or less.

6. The process as in claim 1, wherein the mixing of said finely ground quicklime, burnt dolomite or mixture thereof is effected in a single operation.

7. The process as in claim 1, wherein the mixing of said finely ground quicklime, burnt dolomite or mixture thereof is effected, first, in a paddle mixer, then in a fine mixer.

* * * * *